United States Patent Office 2,776,966
Patented Jan. 8, 1957

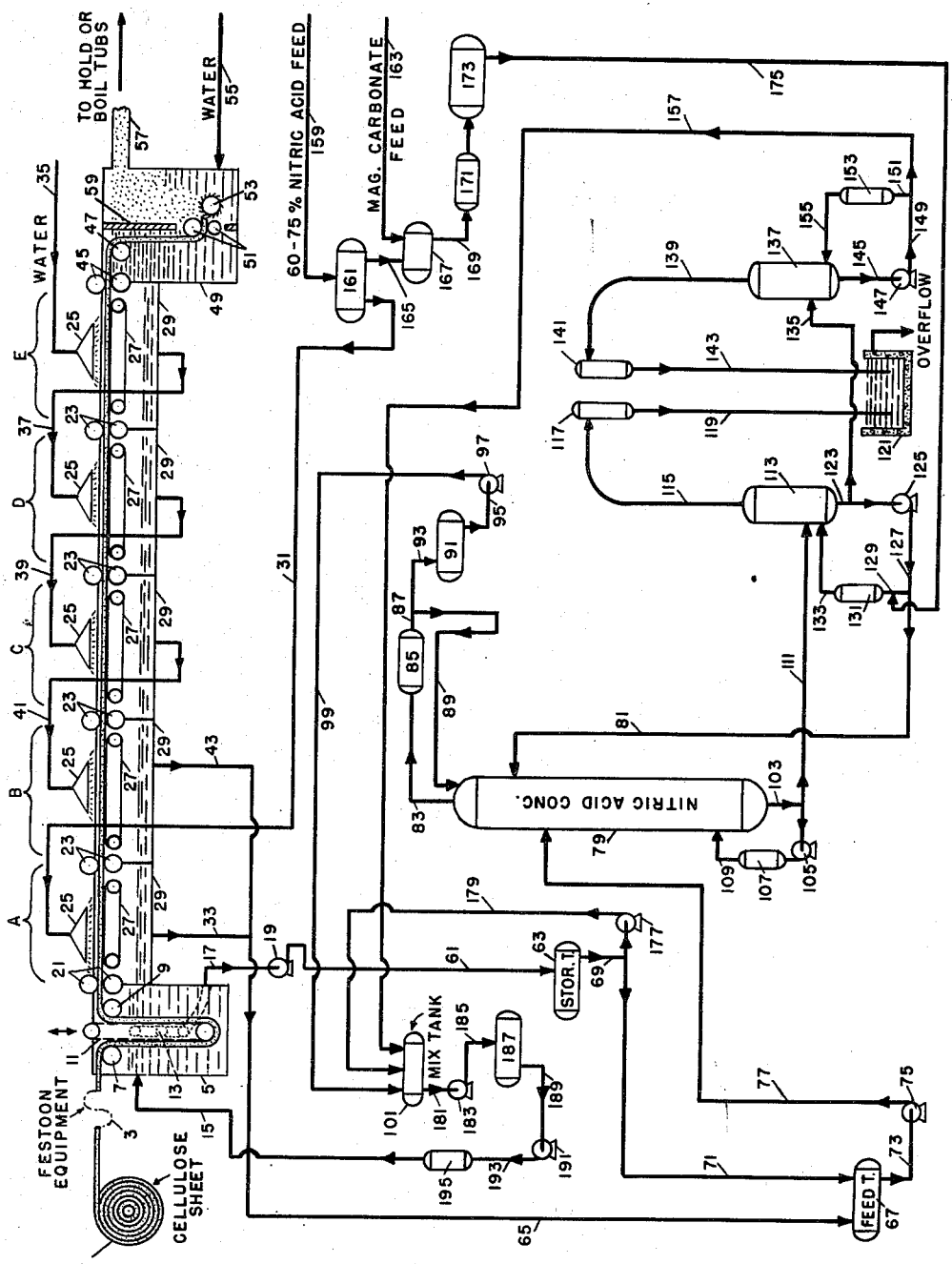

2,776,966

MANUFACTURE OF NITROCELLULOSE

James G. McMillan, Jr., Red Bank, and Warren L. Plunkett, Sayreville, N. J., assignors to Hercules Powder Company, Wilmington, Del., a corporation of Delaware Application March 28, 1956, Serial No. 574,499

7 Claims. (Cl. 260—220)

This invention relates to a continuous method for the preparation of esters of cellulose and more particularly to a continuous system for the production of nitric acid esters of cellulose from cellulose in sheet form wherein a nitrating mixture essentially containing nitric acid, magnesium nitrate, and water is the esterification medium.

Copending application Serial No. 574,388, filed March 28, 1956, by Bennett Brooks, McMillan and Plunkett discloses and claims novel nitric acid esters of cellulose and their preparation by a new method involving nitrating mixtures containing nitric acid, magnesium nitrate, and water as essential ingredients. The method of nitration set forth in the above Bennett et al. application has several notable advantages over the well-known process for producing nitrocellulose which employs mixed nitric-sulfuric acids. To begin with, the nitrating mixtures penetrate and wet even relatively dense aggregates of cellulose particles rapidly and uniformly in contrast to mixed nitric-sulfuric acids, and the nitration reaction is much more rapid. The new method of nitration provides stable nitrocellulose without the necessity for long tedious stabilization treatment heretofore necessary with mixed nitric-sulfuric acids. Moreover, the nitrocelluloses produced are uniformly substituted and substantially completely soluble in acetone, and are free of unstable sulfur compounds. It is evident that these advantages and others make this new method of nitration attractive for the commercial production of nitrocellulose.

It is therefore a principal object of this invention to provide a continuous system for the production of nitrocellulose employing nitrating mixtures containing nitric acid, magnesium nitrate, and water as essential ingredients.

Another object of this invention is to provide a continuous system for the production of nitrocellulose in sheet form wherein fresh nitric acid to replace that consumed in the nitration and lost in the system is rapidly applied to the cellulose sheet to displace the spent nitrating mixture therefrom.

Another object of this invention is to provide a method for preparing cellulose esters in which the esterification proceeds rapidly and uniformly and the time of esterification may be varied independently of the rate of travel of the cellulose sheet.

Another object of this invention is to provide a series of segregated washes on a continuously moving esterified sheet of cellulose in which the washing proceeds rapidly and uniformly.

Still another object of this invention is to provide a uniformly esterified product of increased density in sheet or in discrete particle form.

Generally described, these objects are accomplished by a continuous esterification process in which cellulose in sheet form is passed through an esterification bath and esterification medium is drawn through the sheet. The excess esterification medium is removed from the esterified and continuously moving sheet and the sheet is subjected to a plurality of segregated washes in which the first wash is utilized to replace the acid consumed in esterification and that lost in the process. The esterified cellulose is withdrawn from the process in the form of a sheet or in the form of discrete particles by disintegrating the sheet. In this process, the time of esterification may be varied independently of the rate of travel of the sheet by variation of the length of sheet passing through the esterification bath. Moreover, the esterified sheet may be made increasingly more dense as the successive segregated washes are applied and become more dilute. Accordingly, the esterified sheet may be sufficiently densified to permit further physical modification by known mechanical means such as forming into strips, pellets, shreds, or finely divided particles, where subsequent treatment will be determined by end-product use.

More particularly, the present invention comprises a process for preparing nitric acid esters of cellulose which comprises continuously immersing a sheet of cellulose in a nitrating bath containing essentially nitric acid, magnesium nitrate and water, the ratio of magnesium nitrate to water being at least about 1.2:1 and not more than about 2.2:1 by weight and said nitric acid being present in an amount sufficient to yield a nitric acid ester of cellulose having a nitrogen content of from about 11% to about 13.5% by weight, continuously removing the nitrated sheet from the nitrating bath, and continuously progressing the nitrated sheet through a plurality of segregated washes in which each succeeding washing liquid is of decreased nitric acid content and increased water content. For most purposes the nitrating mixtures of this invention will contain essentially between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1, preferably between about 1.3:1 and about 2:1.

A more specific embodiment of the invention suitable for preparing most types of nitrocellulose comprises continuously immersing a sheet of cellulose in a nitrating bath containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, continuously removing the nitrated sheet from the nitrating bath, and continuously progressing the nitrated sheet through a plurality of segregated washes in which each succeeding washing liquid is of decreased nitric acid content and increased water content.

A preferred embodiment of the invention has been chosen for purposes of illustration and description and is shown in the accompanying diagrammatic drawing wherein reference symbols refer to like parts wherever they occur.

In the drawing, fibrous cellulose sheet 1 is passed through conventional festoon equipment (not shown but represented by 3) into a dip bath vessel 5. The festoon equipment is utilized in the usual manner for splicing additional rolls of cellulose sheet as the process is continuously operated and the sheet fed thereto. The vessel 5 has a guide roll 7 and a guide roll 9 disposed in the upper portion thereof. Interposed between the guide rolls 7 and 9 is a driven foraminous belt 11 which is vertically positioned. The belt 11 is elongated and is movable upwardly or downwardly in respect to the vessel 5 to permit a variation for length of sheet disposed within the vessel 5 and accordingly a variation in reaction time as desired. Interiorly of the belt 11, there is disposed a suction manifold 13. A nitrating mixture containing essentially nitric acid, magnesium nitrate, and water is continuously fed through line 15 into the vessel 5. The sheet from the festoon equipment is fed over guide roll 7 and into juxtaposition with driven foraminous belt 11 where it passes downwardly into the nitrating mixture and upwardly therefrom in contact with the belt 11 and is led from the belt 11 over guide roll 9. During the time the sheet is immersed in the nitrating mixture the suction manifold 13 is continuously operating and sucks the nitrating mixture through the sheet. The driven foraminous belt 11 supports the sheet as suction is applied thereto and conveys the sheet through the dip bath. The suction manifold discharges spent nitrating mixture into line 17 which in turn is connected to suction pump 19.

The nitrated sheet then passes from guide roll 9 through squeeze rolls 21 which remove excess nitrating mixture. The sheet then successively passes through wash zones A, B, C, D and E. Each of the wash zones is separated by a pair of squeeze rolls represented by 23 and is provided with a spray head represented by 25, a driven foraminous belt represented by 27, and a suction box represented by 29. For the first wash, fresh nitric acid of from about 60% to about 75% concentration is fed by line 31 to wash zone A through spray head 25 disposed therein. This wash is a rapid displacement wash in which the fresh nitric acid rapidly passes through the nitrated sheet, foraminous belt 27 and into suction box 29. Effluent from wash zone (A) is withdrawn from suction box 29 through line 33. The second, third, fourth, and fifth washes for wash zones B, C, D and E, respectively, are carried out by recycling the effluent from each succeeding wash to the preceding wash. For example, water or very dilute acid is fed by line 35 to wash zone E through spray head 25 and passes through the nitrated sheet and foraminous belt 27 into suction box 29 from which the effluent is withdrawn by line 37 and fed to spray head 25 in zone D. The effluent withdrawn from zone E contains from about 15% to about 25% nitric acid. Similarly, effluent is withdrawn from the suction boxes of zones D and E and fed to the spray heads 25 in zones C and B by lines 39 and 41, respectively. The effluent withdrawn from zone D contains from about 25% to about 40% nitric acid. The effluent withdrawn from zone C contains from about 40% to about 50% nitric acid. The effluent withdrawn from zone B contains from about 50% to about 60% nitric acid and is withdrawn from the suction box 29 of zone B through line 43.

The nitrated sheet from wash zone E is passed through squeeze rolls 45 and over guide roll 47 into a disintegration bath vessel 49. The vessel 49 has a pair of guide rolls 51 which feeds the nitrated sheet into contact with a disintegration roll 53. This disintegration roll may be a chipper or picker or the like depending on the physical form desired. The disintegration roll 53 revolves against the nitrated sheet being fed thereto and reduces it to particulate form. Water is continuously fed into the disintegration bath vessel 49 through a water line 55 and the particulate nitrated cellulose is discharged from the vessel 49 in the form of a slurry through conduit 57. A baffle wall 59 is provided in the vessel 49 to protect the sheet from the forces generated by the incoming water and the disintegration action and to assist in channeling the stock to discharge through the conduit 57. The nitrocellulose thus produced is passed to hold or boil tubs for subsequent processing as desired.

The example of the preferred embodiment of the invention as given above is susceptible to variation as is the invention in its broader aspects. The cellulose which may be employed is the usual commercial form of sheet cellulose such as that made from cotton, cotton linters, wood pulp or blends thereof. However, regenerated cellulose, woven cellulose materials and the like may be used. For certain end-product uses the nitrated cellulose sheet may be retained in sheet form or slit to form strips thereof and subsequently processed and formed for uses related to explosives, such as press charges, casings, spiral wound cylinders, and the like. However, in accordance with the preferred embodiment of the invention, the process is particularly adapted for the production of nitrocellulose containing a nitrogen content in the order of 12% and suitable for any of the well-known uses to which nitrocellulose in this order of substitution is commonly employed.

The nitrating mixtures in accordance with this invention contain three essential ingredients, namely, nitric acid, magnesium nitrate and water, the ratio of magnesium nitrate to water being at least about 1.2:1 and not more than about 2.2:1, preferably between about 1.3:1 and about 2:1, and the nitric acid being present in an amount sufficient to yield a nitric acid ester of cellulose having a nitrogen content of from about 11% to about 13.5% by weight. It will be understood, of course, that the sum of the three essential components will constitute substantially 100% of the nitrating mixture, any $N_2O_3$ being only an incidental ingredient in the nitrating mixture, since it is well recognized that concentrated nitric acid often contains small percentages of $N_2O_3$, usually on the order of 0.1% or less.

Although for most purposes the nitrating mixtures of this invention will usually contain between about 45% and about 94% nitric acid, between about 3.3% and about 34% magnesium nitrate, and between about 2.7% and about 21% water by weight, it is to be understood that the invention is not to be construed as limited in this respect, since the important feature is the ratio of magnesium nitrate to water as set forth hereinabove, nitric acid being present in an amount sufficient to yield a nitric acid ester of cellulose having a nitrogen content of from about 11% to about 13.5% by weight.

A more specific nitrating mixture suitable for preparing most types of nitrocellulose contains essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, preferably between about 1.3:1 and about 2:1 by weight.

Nitration in accordance with this invention is an equilibrium reaction, the extent of nitration at equilibrium being governed primarily by the composition of the nitrating mixture. Thus, at any given nitric acid content within the limits set forth hereinabove the nitrogen content of the resulting nitrocellulose increases with decreasing water content, in general a decrease of 0.1% in the water content of the nitrating mixture causing a corresponding increase of about 0.05% nitrogen in the nitrocellulose, and vice versa. At the same time for each change in water content there will necessarily be a corresponding inverse change in the magnesium nitrate content of the nitrating mixture. Similarly, at any given water content within the limits set forth hereinabove the nitrogen content of the resulting nitrocellulose decreases with increasing nitric acid content, in general an increase of 1% in the nitric acid content of the nitrating mixture causing a corresponding decrease of about 0.1% nitrogen in the nitrocellulose, and vice versa. Here, likewise, for each change in nitric acid content there will necessarily be a corresponding inverse change in the magnesium nitrate content of the nitrating mixture. Hence, within the above-stated operating limits there are numerous nitrating mixtures for preparing any particular nitrocellulose desired. Likewise, within the above-stated operating limits there are nitrating mixtures suitable for preparing substantially all commercial types of nitrocellulose. The particular nitrating mixture employed will therefore be largely a matter of choice governed primarily by economic considerations.

It is emphasized that cellulose can react with any quantity of the nitrating mixtures of this invention to form nitric acid esters of cellulose. However, in reacting cellulose with the nitrating mixtures of this invention nitric acid is consumed and water is formed. From a practical consideration it is desirable to employ an excess of nitrating mixture over the theoretical stoichiometric requirements. Ordinarily, a ratio of about 30 parts by weight of nitrating mixture per part of cellulose will be used, so that the water formed in the reaction will not unduly dilute the nitrating mixture, but it is to be understood that the invention is not limited in this respect, since the economics of the process largely determines the ratio of nitrating mixture to cellulose. The temperature for the nitrating bath should be from about 15° C. to about 70° C. Below 15° C. the reaction becomes too slow and above 70° C. fibrous cellulose sheet tends to be difficult to handle. The preferred temperature is from about 40° C. to about 60° C. The nitration time to a large extent depends on the density of the fibrous cellulose sheet. Nitration will ordinarily be continued until substantially complete and the resulting nitrocellulose is in equilibrium with the nitrating mix. Depending on the end-product desired and on conditions such as density of sheet, temperature and the like, the time in the nitration bath will range from about 5 minutes to about 60 minutes, it being understood that the cellulose sheet may be fed over a plurality of belts such as belt 11 depicted in the drawing to obtain an increase in reaction time exceeding that made possible by substantially full immersion of the belt.

It will be apparent from the foregoing description that the wash discharge from each succeeding wash will be more concentrated with respect to both nitric acid and magnesium nitrate content than the washing liquid employed to produce that particular wash discharge. In practicing the invention, advantage is taken of this fact in building up the concentration of nitric acid and magnesium nitrate values in the wash discharges to a point where it is economically attractive to recover these values. This is accomplished by employing each wash discharge except the wash discharge from the first wash as the washing liquid in the preceding wash.

It will be apparent from the foregoing description that the quantity of liquid employed in each wash is governed primarily by the quantity employed for the final wash which can be very dilute acid, but preferably is water. The amount of liquid employed for the final wash, in turn, is governed largely by the practical and economic consideration of abstracting an equivalent amount of water from the system at some point further on in the operations. Hence, although larger amounts can be employed, it is desirable to hold the quantity of final wash, and therefore the other washes likewise, to a practical minimum consistent with accomplishing a satisfactory degree of washing without undue dilution of the recovered wash discharge. In practice, it has been found that this can be satisfactorily accomplished with approximately 0.06 to 0.2 gallon of final wash liquid per pound of nitrocellulose with the time for each wash accomplished in a matter of seconds ordinarily not exceeding about 30.

Although the washing procedure in accordance with this invention necessarily involves initiating the operations with previously prepared wash liquids of predetermined composition, it will be apparent that equilibrium conditions will be rapidly established, owing to the recirculation features of this invention, wherein the composition of each wash discharge is governed largely by the composition of the acid liquid adhering to the nitrocellulose entering the washing schedule and the number of washes making up the washing schedule. It will further be appreciated that as the washing progresses the washing becomes less critical and the density of the sheet may be increased if desired by increasing the pressure of squeeze rolls 23, particularly in the later stages of washing, such as zones C, D and E.

Having described the nitration portion of the continuous system hereinabove, the recovery and fortification portion of the system is now described with reference to the drawing. The spent nitrating mixture from suction pump 19 passes through line 61 into storage tank 63. The effluent passing through line 33 from wash zone A and the effluent passing through line 43 from wash zone B are both passed into line 65 which feeds into feed tank 67. Additionally, a portion of the spent nitrating mixture from storage tank 63 is passed through lines 69 and 71 to the feed tank 67. The nitric acid solution from feed tank 67 is fed through line 73 to pump 75 and then passes through line 77 to the stripping zone in the upper portion of nitric acid concentrator 79. Recovered magnesium nitrate solution containing approximately 72% magnesium nitrate is simultaneously introduced through line 81 into the stripping zone in the upper portion of nitric acid concentrator 79 where it is employed as the dehydrating agent in the concentration of nitric acid. Substantially all of the nitric acid is taken off overhead from the nitric acid concentrator 79 as concentrated nitric acid vapors of approximately 98.5% concentration, which vapors pass through line 83 to condenser 85. Part of the condensed concentrated nitric acid is returned as reflux to the top of the nitric acid concentrator 79 through lines 87 and 89. The remaining condensed concentrated nitric acid is collected in concentrated nitric acid storage tank 91 through lines 87 and 93. From the storage tank 91 the concentrated nitric acid is fed through line 95, pump 97, and line 99 to mix tank 101 where it is employed to fortify the spent nitrating mixture.

Dilute magnesium nitrate solution substantially free of nitric acid is taken off as still bottoms from the nitric acid concentrator 79. Part of the still bottoms is recirculated through line 103, pump 105, boiling tubes 107 and line 109 to the nitric acid concentrator 79 to supply heat for the distillation of nitric acid. The remaining still bottoms pass through lines 103 and 111 to magnesium nitrate recovery still 113. Water vapor is taken off overhead through line 115 to condenser 117, and condensed water passes through line 119 to hot well 121. The still bottoms consist of recovered magnesium nitrate solution of approximately 72% concentration, part of which is recycled through line 123, pump 125, lines 127 and 129, boiling tubes 131, and line 133 to the magnesium nitrate recovery still 113 to supply heat for the distillation. Another portion of the recovered magnesium nitrate solution is recycled through line 123, pump 125, and lines 127 and 81 to the nitric acid concentrator 79 where it is employed as the dehydrating agent in the concentration of nitric acid. The remaining portion of the recovered magnesium nitrate solution is passed through lines 123 and 135 to magnesium nitrate concentrating still 137. Water vapor is taken off overhead through line 139 to condenser 141, and condensed water passes through line 143 to the hot well 121. The still bottoms consist of concentrated magnesium nitrate solution of about 80% concentration, part of which is recycled through line 145, pump 147, lines 149 and 151, boiling tubes 153, and line 155 to the magnesium nitrate concentrating still 137 to supply heat for the distillation. The remaining concentrated magnesium nitrate solution is conveyed through line 145, pump 147, and lines 149 and 157 to mix tank 101 where it is employed to fortify the spent nitrating mixture.

Fresh nitric acid of 60–75% concentration, to replace nitric acid consumed in the nitration and lost in the system, is supplied to the system through line 159, storage tank 161, and line 31 from which it is introduced into zone A. This fresh nitric acid is employed in the first wash zone hereinbefore described.

Fresh magnesium nitrate to replace that lost in the system is prepared by introducing predetermined amounts of magnesium carbonate through line 163, and predetermined amounts of fresh nitric acid of about 60–75% concentration through line 165 into reactor tank 167. The reaction mixture then passes through line 169 to filter 171 and from the filter into fresh magnesium nitrate storage tank 173. The fresh magnesium nitrate is supplied to the system from storage tank 173 through line 175 and then to the boiling tubes 131. The magnesium nitrate requirements of the system from thereon are met as hereinbefore described. For completion of make-up of the nitrating mixture, a portion of the spent nitrating mixture from storage tank 63 which passes through line 69 is fed to pump 177 and then through line 179 to the mix tank 101. From the mix tank 101, the fortified nitrating mix is passed through line 181 to pump 183 and from the pump through line 185 into nitrating mixture storage tank 187. The nitrating mixture from storage tank 187 is passed through line 189, pump 191, line 193, heater 195 from whence it passes through line 15 hereinbefore described as the line for continuously feeding the mixture containing essentially nitric acid, magnesium nitrate, and water into the dip bath vessel 5.

Upon completion of the washing steps in accordance with this invention, the nitrocellulose is withdrawn from the system for subsequent additional purification, viscosity adjustment, dehydration, and the like, as desired. Approximately 85% or more of the nitric acid and magnesium nitrate values present in the retained spent nitrating mixture remaining in the nitrocellulose is recovered for re-use in the system by the first zone displacement wash with fresh nitric acid and the subsequent washing steps set forth. Hence, only about 15% or less of the nitric acid and magnesium nitrate values present in the retained spent nitrating mixture remaining in the nitrocellulose after washing is left in the nitrocellulose when the latter is withdrawn from the system for subsequent conventional treatment as desired. These nitric acid and magnesium nitrate values which are still present in the nitrocellulose withdrawn from the system are considered for the purposes of this invention as lost in the system, and must be taken into consideration in determining the amount of fresh nitric acid and fresh magnesium nitrate to add to the system in order to keep it in balance.

A predetermined part of the spent nitrating mixture recovered is fortified with predetermined amounts of concentrated nitric acid and concentrated magnesium nitrate solution and is then recycled as the nitrating mixture for the nitration reaction. It is important for economic reasons to employ nitric acid and magnesium nitrate solutions as concentrated as practically feasible in order to utilize the maximum amount of spent nitrating mixture in this way. It is presently preferred to employ 98.5 to 99% nitric acid and about 80% magnesium nitrate solution for this purpose.

The concentrated nitric acid for fortifying spent nitrating mixture is obtained by concentrating the remainder of the recovered spent nitrating mixture, usually referred to in the parlance of the art as "accumulated" spent nitrating mixture, the recovered discharge from the displacement wash and the recovered discharge from the first wash in a nitric acid concentrator using magnesium nitrate as the dehydrating agent. It is important that the nitric acid be concentrated in this manner to avoid unnecessary loss of magnesium nitrate in the recovery operations, and to avoid unnecessary introduction into the system of undesirable contaminants.

It is preferred to employ the method described and claimed in U. S. Patent 2,716,631 to Robert J. Bechtel for obtaining concentrated nitric acid.

Although the magnesium nitrate solution employed in the concentration of nitric acid having a concentration of approximately 72% can be employed to fortify the spent nitrating mixture of this invention, it is much more desirable for practical reasons to further concentrate the magnesium nitrate solution from the nitric acid concentrator to approximately 80% strength.

In order to keep the system in balance, it is necessary to introduce fresh magnesium nitrate into the system to replace that which is lost in the system, as hereinbefore set forth. In the embodiment illustrated by the drawings this is accomplished by reacting the required amount of magnesium carbonate with fresh nitric acid of 60 to 75% strength and introducing the solution thus formed into the system in the magnesium nitrate recovery step. However, the invention is not limited in this respect, for it is obvious that various other means of adding fresh magnesium nitrate to the system are within the scope of this invention. By way of example, commercial magnesium nitrate hexahydrate can be melted and added to the system in the magnesium nitrate recovery step, or magnesium carbonate, oxide, or hydroxide can be reacted with concentrated nitric acid obtained from the nitric acid concentrator and the resulting concentrated magnesium nitrate solution can be used to augment the concentrated magnesium nitrate solution employed for fortification purposes.

The following example sets forth a specific embodiment of the invention. It is to be understood, however, that this example is purely illustrative and not to be construed as a limitation of the invention.

*Example*

A nitrating mixture was prepared which contained 65.26% nitric acid, 20.35% magnesium nitrate, 14.34% water, and 0.05% $N_2O_3$. This mixture was brought to 50° C. and 1 part of air-dry sheeted wood pulp about 0.05 inch thick was immersed into 66 parts by weight of the nitrating mixture. The cellulose was nitrated at about 50° C. after which the sheet of nitrocellulose was drowned in a large excess of water, about 60 parts water to 1 part nitrocellulose. Washing was continued until the nitrocellulose was free of acid and then dried in a stream of air at about 60° C. The nitrogen content was found to be 11.62% by weight. The nitrocellulose had a stability of 15 minutes in the 134.5° C. heat test and formed a clear, smooth solution is acetone.

It is evident from the foregoing description that this invention has several notable advantages over the well-known commercial process for producing nitrocellulose which employs mixed nitric-sulfuric acids. To begin with, the nitrating mixtures of this invention penetrate and wet the sheet cellulose rapidly and uniformly in contrast to mixed nitric-sulfuric acid, which requires that the cellulose be very carefully shredded, fluffed and opened up and made free of closely packed aggregates of fibers such as pills, balls, and the like. The nitration reaction of this invention is much more rapid than the well-known commercial process. The process of this invention is continuous whereas, heretofore, continuous operation has never been successful. This invention provides stable nitrocelluloses without the necessity for long tedious stabilization treatment heretofore necessary. Moreover, this invention provides nitrocelluloses which are uniformly substituted as evidenced by substantially complete solubility in acetone and which are free of sulfur, and provides nitrocelluloses of increased density. Heretofore, products having these combined characteristics have not been produced.

The nitrocelluloses of this invention are useful in all well-known applications for nitrocellulose where the nitrocellulose contains between about 11% and 13.5% nitrogen, including plastics, films, lacquers, protective coatings, moistureproof coatings, coated fabrics, adhesives, explosives, and many others.

This is a continuation-in-part of our copending application Serial No. 327,148, filed December 20, 1952, now abandoned.

What we claim and desire to protect by Letters Patent is:

1. A process for preparing nitric acid esters of cellulose which comprises continuously immersing a sheet of cellulose in a nitrating bath containing essentially nitric acid, magnesium nitrate and water, the ratio of magnesium nitrate to water being at least about 1.2:1 and not more than about 2.2:1 by weight and said nitric acid being present in an amount sufficient to yield a nitric acid ester of cellulose having a nitrogen content of from about 11% to about 13.5% by weight, continuously removing the nitrated sheet from the nitrating bath, and continuously progressing the nitrated sheet through a plurality of segregated washes in which each succeeding washing liquid is of decreased nitric acid content and increased water content.

2. A process for preparing nitric acid esters of cellulose which comprises continuously immersing a sheet of cellulose in a nitrating bath containing essentially between about 45% and about 94% nitric acid, between about 3.3% and about 34% magnesium nitrate, and between about 2.7% to about 21% water by weight, the ratio of magnesium nitrate to water being at least about 1.2:1 and not more than about 2.2:1, continuously removing the nitrated sheet from the nitrating bath, and continuously progressing the nitrated sheet through a plurality of segregated washes in which each succeeding washing liquid is of decreased nitric acid content and increased water content.

3. A process for preparing nitric acid esters of cellulose which comprises continuously immersing a sheet of cellulose in a nitrating bath containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, continuously removing the nitrated sheet from the nitrating bath, and continuously progressing the nitrated sheet through a plurality of segregated washes in which each succeeding washing liquid is of decreased nitric acid content and increased water content.

4. A process for preparing nitric acid esters of cellulose which comprises continuously immersing a sheet of cellulose in a nitrating bath containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, continuously removing the nitrated sheet from the nitrating bath, continuously progressing the nitrated sheet through a first segregated wash zone in which the washing liquid is fresh nitric acid having a concentration between about 60% and about 75% by weight, and continuously progressing the nitrated sheet through a plurality of succeeding wash zones in which the washing liquid is decreased in nitric acid content and increased in water content for each succeeding wash zone.

5. A process for preparing nitric acid esters of cellulose which comprises continuously immersing a sheet of cellulose in a nitrating bath containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, continuously removing the nitrated sheet from the nitrating bath, continuously progressing the nitrated sheet through a first segregated wash zone in which the washing liquid is fresh nitric acid having a concentration between about 60% and about 75% by weight, and continuously progressing the nitrated sheet through a plurality of succeeding, segregated wash zones in which the washing liquid is decreased in nitric acid content and increased in water content for each succeeding wash zone with the final washing liquid being water.

6. A process for preparing nitric acid esters of cellulose which comprises continuously immersing a sheet of cellulose in a nitrating bath containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, continuously removing the nitrated sheet from the nitrating bath, continuously progressing the nitrated sheet through a first segregated wash zone in which the washing liquid is fresh nitric acid having a concentration between about 60% and about 75% by weight, continuously progressing the nitrated sheet through a plurality of succeeding, segregated wash zones in which the washing liquid is decreased in nitric acid content and increased in water content for each succeeding wash zone with the final washing liquid being water, and passing the continuously progressing nitrated sheet into a disintegration bath where it is reduced to finely divided nitrocellulose.

7. A continuous process for preparing nitric acid esters of cellulose which comprises continuously immersing a sheet of cellulose in a nitrating bath containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, continuously removing the nitrated sheet from the nitrating bath, continuously progressing the nitrated sheet through a first segregated wash zone in which the washing liquid is fresh nitric acid having a concentration between about 60% and about 75% by weight, continuously progressing the nitrated sheet through a plurality of succeeding, segregated wash zones in which the washing liquid is decreased in nitric acid content and increased in water content for each succeeding wash zone with the final washing liquid being water, increasing the density of the continuously progressing nitrated sheet as it passes through the plurality of segregated washes, passing the densified and continuously progressing nitrated sheet into a disintegration bath where it is reduced to finely divided nitrocellulose, and withdrawing the finely divided nitrocellulose from the process.

No references cited.